US012573090B2

(12) United States Patent
Lu

(10) Patent No.: US 12,573,090 B2
(45) Date of Patent: Mar. 10, 2026

(54) ENCAPSULATION POSITIONING MARK METHOD

(71) Applicant: SAULTECH TECHNOLOGY CO., LTD., Zhubei (TW)

(72) Inventor: Yen Hao Lu, Zhubei (TW)

(73) Assignee: SAULTECH TECHNOLOGY CO., LTD., Hsinchu County (TW)

( * ) Notice: Subject to any disclaimer, the term of this patent is extended or adjusted under 35 U.S.C. 154(b) by 0 days.

(21) Appl. No.: 18/779,204

(22) Filed: Jul. 22, 2024

(65) Prior Publication Data

US 2025/0378577 A1      Dec. 11, 2025

(30) Foreign Application Priority Data

Jun. 11, 2024    (TW) ................................. 113121550

(51) Int. Cl.
*G06T 7/73* (2017.01)
*G06T 7/00* (2017.01)
*H04N 23/90* (2023.01)

(52) U.S. Cl.
CPC ................ *G06T 7/74* (2017.01); *G06T 7/001* (2013.01); *H04N 23/90* (2023.01); *G06T 2207/30148* (2013.01); *G06T 2207/30204* (2013.01)

(58) Field of Classification Search
CPC ............. H01L 21/681; H01L 21/67144; H01L 21/67259; H01L 21/6836; H01L 21/6838; H01L 23/544; H01L 21/67132; H01L 2221/68368; H01L 2223/54426
USPC ........................................................... 348/87
See application file for complete search history.

(56) References Cited

U.S. PATENT DOCUMENTS

2017/0148759 A1* 5/2017 Hayata .................... H01L 24/83
2022/0199433 A1* 6/2022 Kobashi .................. G06T 7/001

* cited by examiner

*Primary Examiner* — Masum Billah

(57) ABSTRACT

An encapsulation positioning mark method includes: synchronously moving a die-bonding device, a reflector and a correction sheet below a first image capture unit until the first image capture unit clearly captures an image of a mark on the correction sheet through the reflector to obtain a first template; synchronously moving the die-bonding device, the reflector and the correction sheet away from the first image capture unit, moving a substrate below the first image capture unit until the first image capture unit clearly captures an image of a mark on a die placement area of the substrate to obtain a position of the die placement of the substrate; and synchronously moving the die-bonding device, the reflector and the correction sheet to a preset position according to the first template and the position of the die placement of the substrate, so that the die-bonding device is aligned with the die placement area.

7 Claims, 17 Drawing Sheets

S60

S20

S10

S20

S10

S40

S60

ENCAPSULATION POSITIONING MARK METHOD

BACKGROUND OF THE INVENTION

1. Field of the Invention

The present invention relates generally to an encapsulation positioning mark method.

2. The Prior Arts

Integrated circuits are fabricated on semiconductor wafers in bulk through multiple processes, and the wafers are further divided into a plurality of dies. In other words, a die is a small unpackaged integrated circuit body made of semiconductor materials. A plurality of divided dies are neatly attached to a carrier device, and then a carrier frame is responsible for transporting the carrier device, and then a die-bonding device is used to sequentially transfer the dice to the substrate for subsequent processing.

Because the die-bonding device will deviate every time it suctions the die, the conventional technology proposes a packaging positioning method, which includes the following steps: an image capture unit captures images of the die-bonding device and the die; a processing unit calculates the relative position of the die-bonding device and the die based on the images of the die-solid device and the die; and the processing unit moves the die-bonding device based on the relative position of the die-bonding device and the die, so that the die-bonding device can place the die on a die placement area of a substrate.

However, when the die-bonding device places the die on the die placement area of the substrate, the die-bonding device still has a slight deviation, resulting in the die being unable to be accurately placed on the die placement area of the substrate.

In order to solve the above problem, the conventional technology proposes a package mark positioning method, which includes the following steps: two first image capture units respectively capture images of two second image capture units, the two second image capture units capture images of the two first image capture units respectively, and a control unit obtains the relative positions of the first image capture units and the second image capture units based on the images; a die-bonding device suctions a die, a correction sheet is installed on the die-bonding device through a fixing piece, and the die-bonding device, the fixing piece and the correction sheet are synchronously moved to below the first image capture units and above the second image capture units, until the first image capture units directly and clearly capture the images of the two marks of the correction sheet, and the second image capture units directly and clearly capture the images of the die-bonding device and the die respectively to obtain a first template and a second template; the first image capture units directly and clearly capture the images of the marks on the correction sheet, and the images of the marks on the correction sheet are located on a first focal length of the first image capture units at this point; move a substrate below the die-bonding device, and stagger the two marks outside a die placement area of the substrate with the marks on the correction sheet; the first image capture units move downward until the first image capture units directly and clearly capture the images of the marks outside the die placement area of the substrate, the marks outside of the die placement area of the substrate are located at the second focal length of the first image capture units at this point, and the first focal length is equal to the second focal length to obtain the position of the die placement area of the substrate; the control unit places the die according to the first template, the position of the die placement area of the substrate, and relative positions of the first image capture units and the second image capture units to synchronously move the die-bonding device, the fixing piece and the correction sheet to a preset position, so that the die-bonding device is aligned with the die placement area of the substrate; the control unit adjusts the horizontal position of the die-bonding device according to the position of the second template, the position of the die placement area of the substrate and the relative positions of the first image capture units and the second image capture units until the die is aligned with the die placement area of the substrate; and the die-bonding device places the die on the die placement area of the substrate.

However, if the first image capture units capture the images of the mark on the correction sheet according to the first focal length, the image will be blurry, so the first image capture units must move downward until the first focal length is equal to the second focal length, so that the first image capture units can clearly capture the images of the marks on the correction sheet.

Furthermore, the marks outside the die placement area of the substrate must be staggered with the marks on the correction sheet, otherwise the marks outside the die placement area of the substrate will be blocked by the die-bonding device and the correction sheet. However, the marks outside the die placement area of the substrate will be too far from the die placement area, resulting in an inaccurate positioning of the die placement area of the substrate, and the die-bonding device cannot be aligned with the die placement area of the substrate.

SUMMARY OF THE INVENTION

A primary objective of the present invention is to provide an encapsulation positioning mark method that can align the die-bonding device with the die placement area of the substrate while the first image capture unit remains stationary.

Another objective of the present invention is to provide an encapsulation positioning mark method, and the obtained position of the die placement area of the substrate is accurate.

In order to achieve the aforementioned objectives, the present invention provides an encapsulation positioning mark method, which includes the following steps: (a) synchronously moving a die-bonding device, at least one reflector and at least one correction sheet to below at least one first image capture unit, until the at least one first image capture unit indirectly and clearly captures an image of at least one mark of the correction sheets through the reflection of the at least one reflector, to obtain a first template, at this point, the at least one mark of the at least one correction sheet is located at a first focal length of the at least one first image capture unit; (b) synchronously move the die-bonding device, the at least one reflector and the at least one correction sheet away from the at least one first image capture unit and move a substrate to below the at least one first image capture unit until the at least one first image capture unit directly and clearly captures an image of at least one mark on a die placement area of the substrate to obtain a position of the die placement area of the substrate, a this time, the at least one mark on the die placement area of the substrate is located on a second focal length of the at least one first image capture unit, and the first focal length is equal to the second focal length; and (c) a control unit moves the die-bonding device, the at least one reflector and the at least one correction sheet synchronously according to the first template and the position of the die placement area of the substrate to a preset position, so that the die-bonding device is aligned with the die placement area of the substrate.

In some embodiments, step (a) further includes: the die-bonding device suctions at least one die, and synchronously moves the die-bonding device, the at least one reflector and the at least one correction sheet to above at least one second image capture unit until the at least one second image capture unit directly and clearly captures the image of the die-bonding device and the die to obtain a second template; wherein, after step (c), the method further includes the following steps: (d) the control unit adjusts the horizontal position of the die-bonding device according to the second template and the position of the die placement area of the substrate until the die is aligned with the die placement area of the substrate; (e) the die-bonding device places the die on the die placement area of the substrate.

In some embodiments, the following steps are further included before step (a): (f) the at least one first image capture unit captures an image of the at least one second image capture unit, the at least one second image capture unit captures an image of the at least one first image capture unit, and the control unit obtains the relative positions of the at least one first image capture unit and the at least one second image capture unit according to the images; wherein, step (c) further includes: the control unit, according to the first template, the position of the die placement area of the substrate and relative positions of the at least one first image capture unit and the at least one second image capture unit, synchronously move the die-bonding device, the at least one reflector and the at least one correction sheet to the preset position; wherein step (d) further includes: the control unit, according to the second template, the position of the die placement area of the substrate and the relative positions of the at least one first image capture unit and the at least one second image capture unit, adjust the horizontal position of the die-bonding device.

In some embodiments, the number of the at least one first image capture unit is a plurality, the number of the at least one second image capture unit is a plurality, the number of the at least one reflector is a plurality with opposite directions of the reflective surfaces, and the number of the at least one correction sheets is a plurality and respectively located on one side of the reflective surfaces of the reflectors.

In some embodiments, the number of the at least one first image capture unit is one, the number of the at least one second image capture unit is one, the number of the at least one reflector is one, and the number of the at least one correction sheet, located on one side of the reflective surface of the reflector.

The effect of the present invention is that the method of the present invention can first obtain the first template through the first image capture unit, the die-bonding device, the reflector and the correction sheet, and then obtain the position of the die placement area of the substrate through the first image capture unit, and the first focal length is equal to the second focal length, so that the method of the present invention can synchronously move the die-bonding device, the reflector and the correction sheet to the preset position while the first image capture unit remains stationary.

Furthermore, the method of the present invention can directly and clearly capture the image of the mark on the ide placement area of the substrate through the first image capture unit when the die-bonding device, the reflector and the correction sheet are far away from the first image capture unit. Therefore, the position of the die placement area of the substrate obtained by the method of the present invention is accurate.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
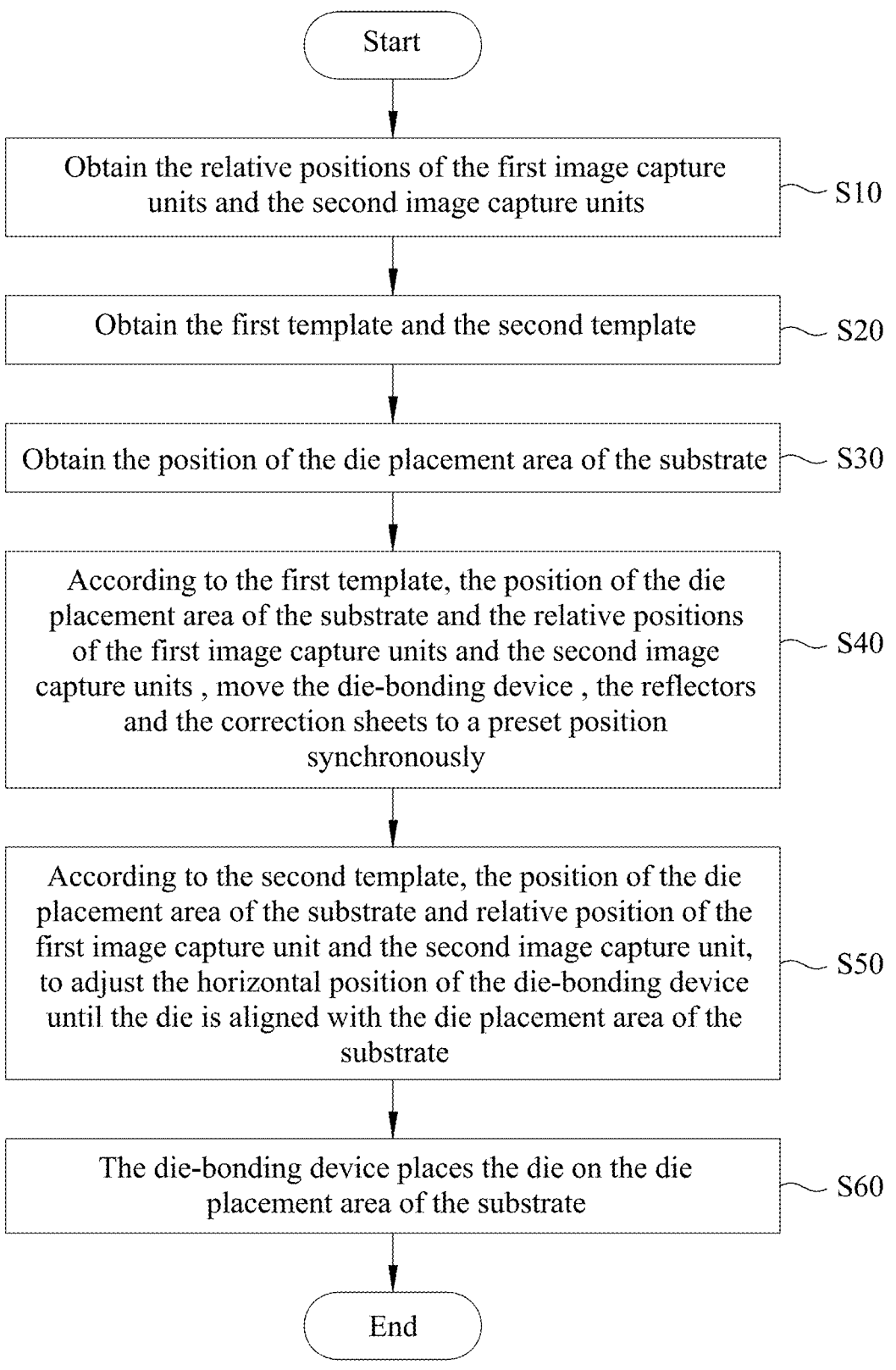
FIG. 1 is a flowchart of the method of the present invention.
Figure 3:
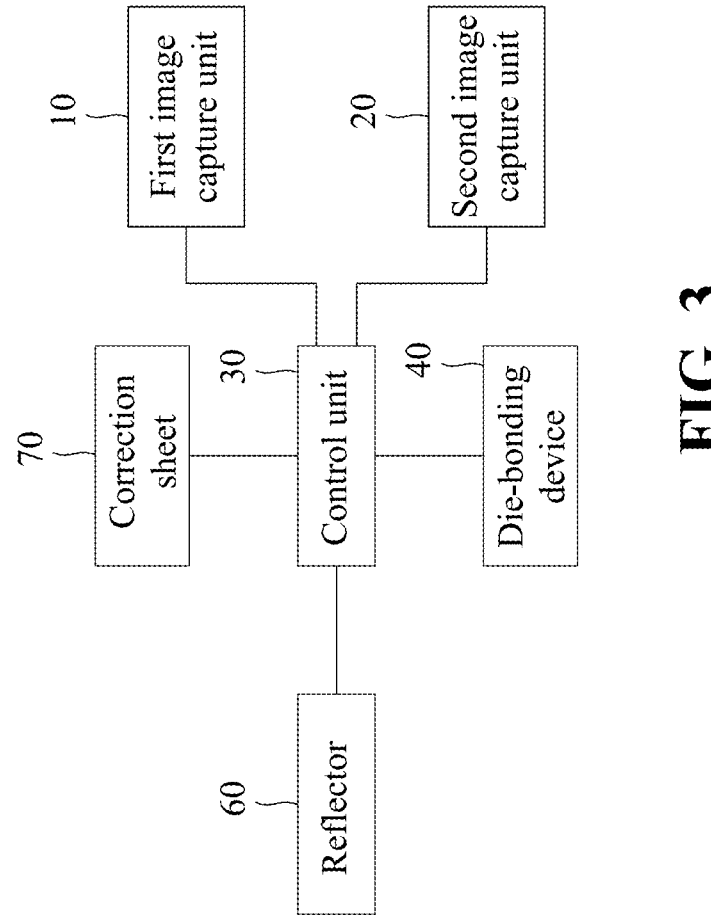
FIG. 3 is a schematic view of the connection relationship of all elements of the present invention.
Figure 2:
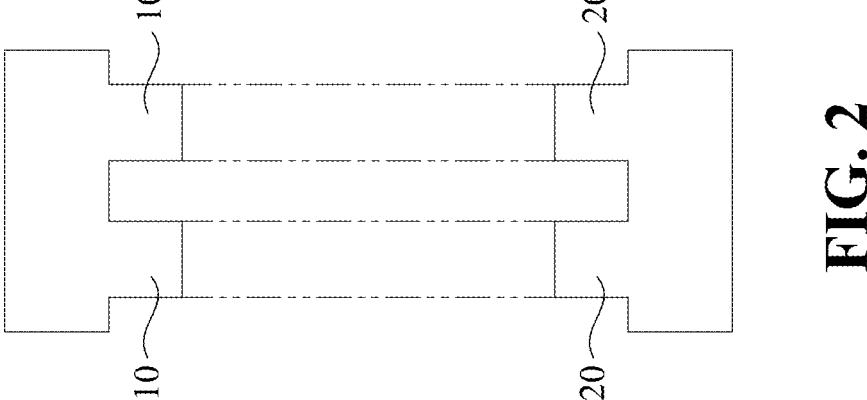
FIG. 2 is a schematic view of step S10 in the first embodiment of the method of the present invention.
Figure 4:
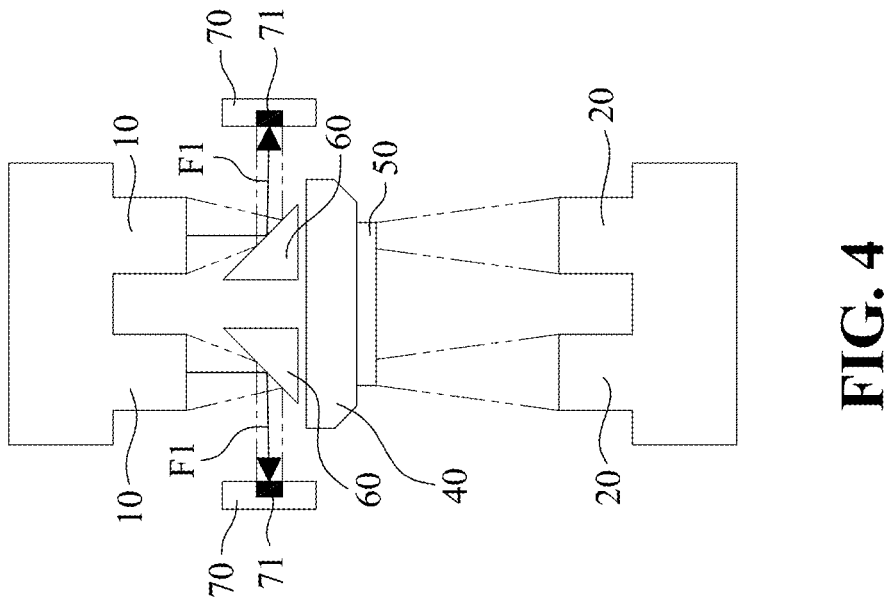
FIG. 4 is a schematic view of step S20 of the first embodiment of the method of the present invention.

FIG. 1 is a flow hart of the method of the present invention. FIG. 2 is a schematic view of step S10 in the first embodiment of the method of the present invention. FIG. 3 is a schematic view of the connection relationship of all elements of the present invention. FIG. 4 is a schematic view

Figure 5:
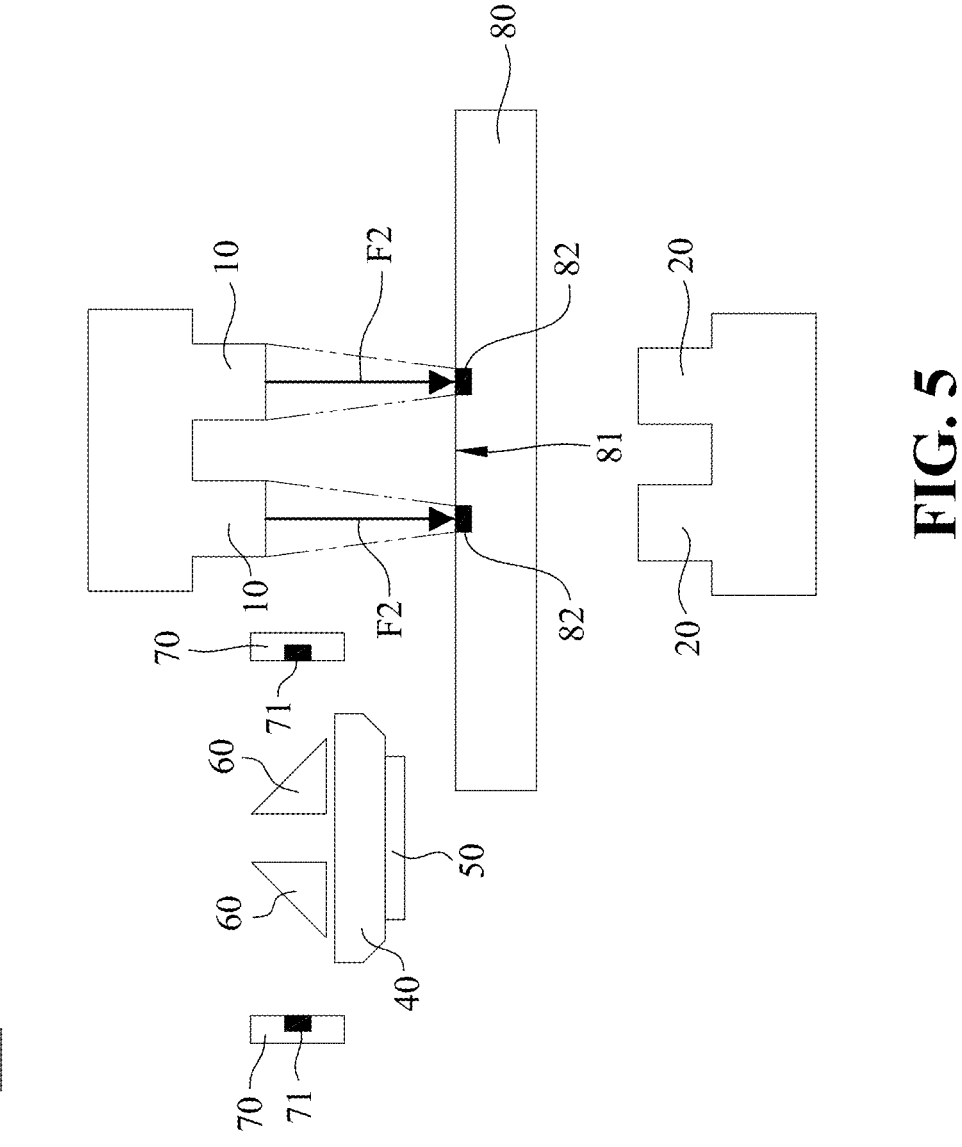
FIG. 5 is a schematic view of step S30 of the first embodiment of the method of the present invention.
Figure 6:
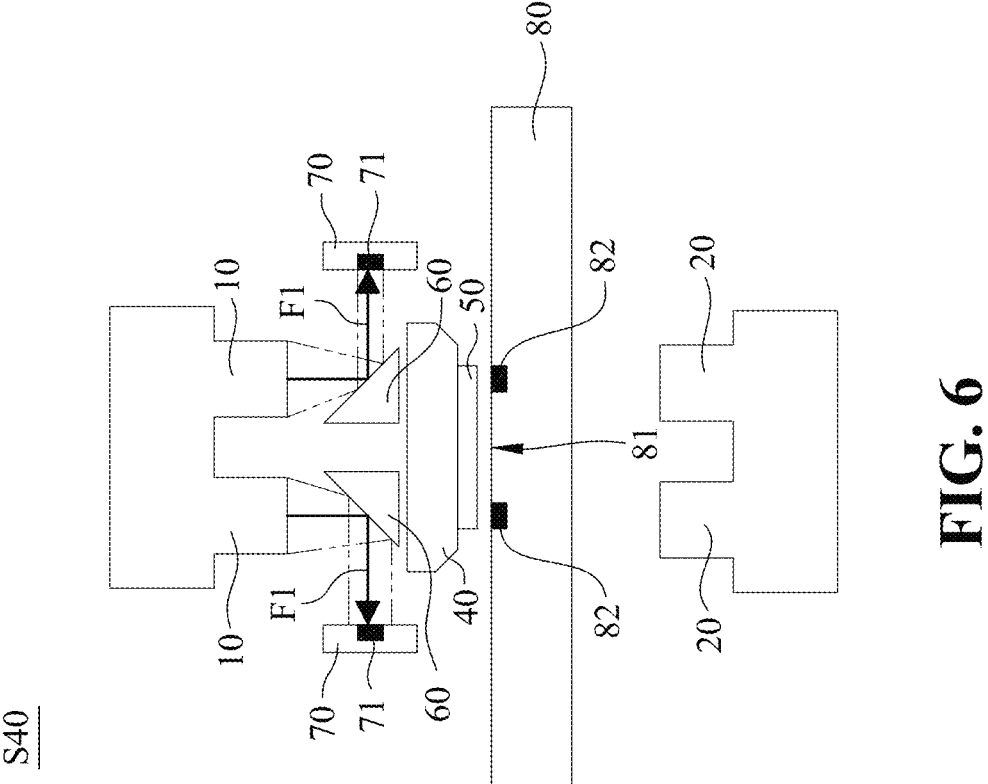
FIG. 6 is a schematic view of step S40 of the first embodiment of the method of the present invention.
Figure 7:
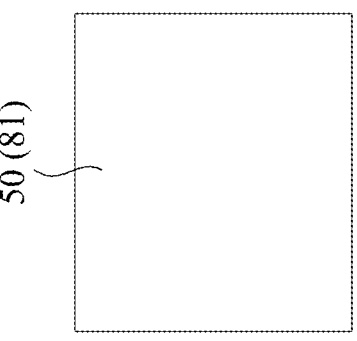
FIG. 7 is a schematic view of step S50 of the first embodiment of the method of the present invention.
Figure 7:
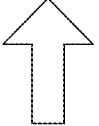
Figure 7:
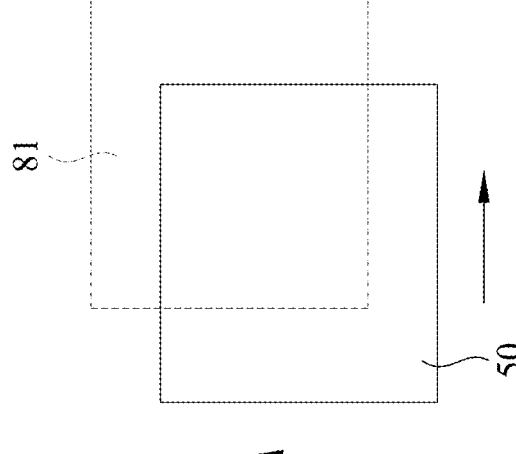
Figure 8:
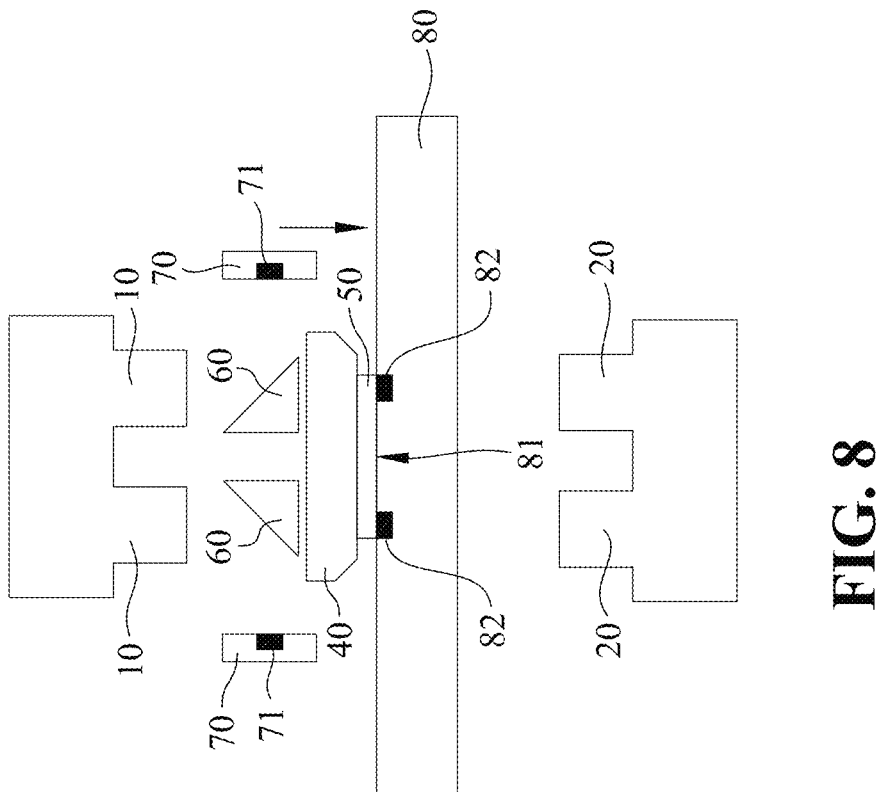
FIG. 8 is a schematic view of step S60 of the first embodiment of the method of the present invention.

5 of step S20 of the first embodiment of the method of the present invention. FIG. 5 is a schematic view of step S30 of the first embodiment of the method of the present invention. FIG. 6 is a schematic view of step S40 of the first embodiment of the method of the present invention. FIG. 7 is a schematic view of step S50 of the first embodiment of the method of the present invention. FIG. 8 is a schematic view of step S60 of the first embodiment of the method of the present invention. The invention provides an encapsulation positioning mark method, which includes the following steps:

Step S10, as shown in FIG. 1, FIG. 2 and FIG. 3, the two first image capture units 10 respectively capture images of the two second image capture units 20, and the second image capture units 20 respectively capture the images of the first image capture units 10, and a control unit 30 obtains the relative positions of the first image capture units 10 and the second image capture units 20 according to the images.

Step S20, as shown in FIG. 1 and FIG. 4, a die-bonding device 40 suctions a single die 50, and the die-bonding device 40, two reflectors 60 in opposite directions, and two correction sheets 70 respectively located on one side of the reflective surface of each reflector 60 move simultaneously to below the first image capture units 10 and above the second image capture units 20 until the first image capture units 10 indirectly and clearly capture the images of the two marks 71 of the correction sheets 70 through the reflection of the reflector 60, and the second image capture units 20 directly and clearly capture the images of the die-bonding device 40 and the die 50 respectively, so as to obtain a first template and a second template; at this time, the marks 71 of the correction sheets 70 are located at a first focal length F1 of the first image capture units 10.

Step S30, as shown in FIG. 1 and FIG. 5, the die-bonding device 40, the reflectors 60 and the correction sheets 70 are moved synchronously away from the first image capture units 10, and a substrate 80 is moved to below the first image capture units 10 until the first image capture units 10 directly and clearly capture the image of the two marks 82 on a die placement area 81 of the substrate 80 to obtain the position of the die placement area 81 of the substrate 80. At this time, the marks 82 on the die placement area 81 of the substrate 80 are located on a second focal length F2 of the first image capture units 10, and the first focal length F1 is equal to second focal length F2.

Step S40, as shown in FIGS. 1, 3 and 6, the control unit 30 determines, according to the first template, the position of the die placement area 81 of the substrate 80 and the relative positions of the first image capture units 10 and the second image capture units 20, to move the die-bonding device 40, the reflectors 60 and the correction sheets 70 to a preset position synchronously, so that the die-bonding device 40 is aligned with the die placement area 81 of the substrate 80.

Step S50, as shown in FIG. 1, FIG. 3 and FIG. 7, the control unit 30 determines, according to the second template, the position of the die placement area 81 of the substrate 80 and relative position of the first image capture units 10 and the second image capture units 20, to adjust the horizontal position of the die-bonding device 40 until the die 50 is aligned with the die placement area 81 of the substrate 80.

In some embodiments, the number of the first image capture units 10, the second image capture units 20, the reflectors 60 and the correction sheets 70 may be more than two, each correction sheet 70 has a plurality of marks 71, and the die-bonding device 40 can suctions a plurality of dies 50.

6

Figure 10:
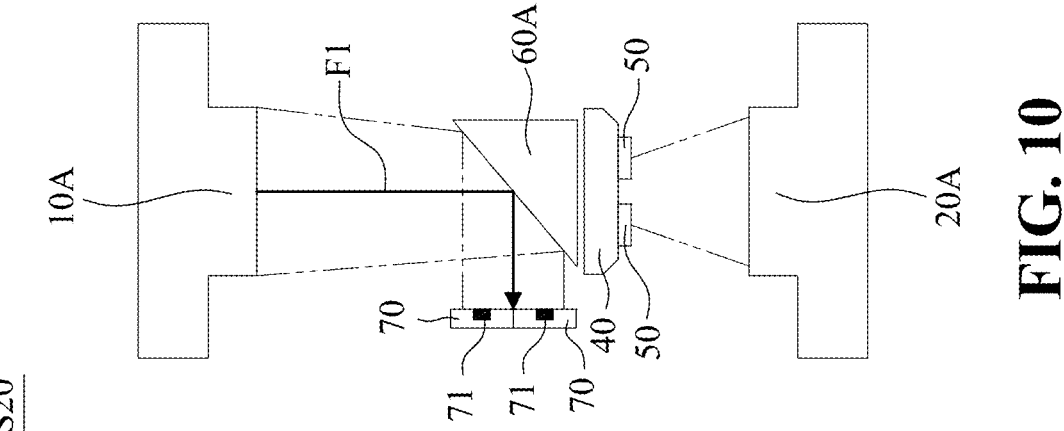
FIG. 10 is a schematic view of step S20 of the second embodiment of the method of the present invention.
Figure 9:
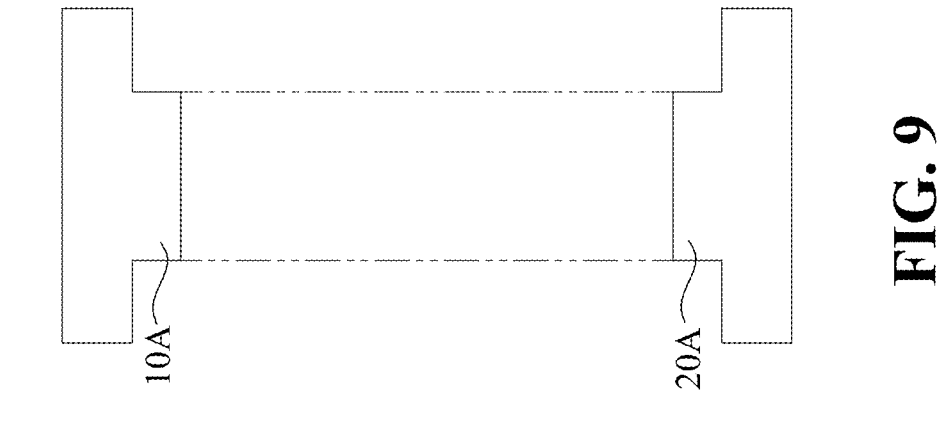
FIG. 9 is a schematic view of step S10 of the second embodiment of the method of the present invention.
Figure 11:
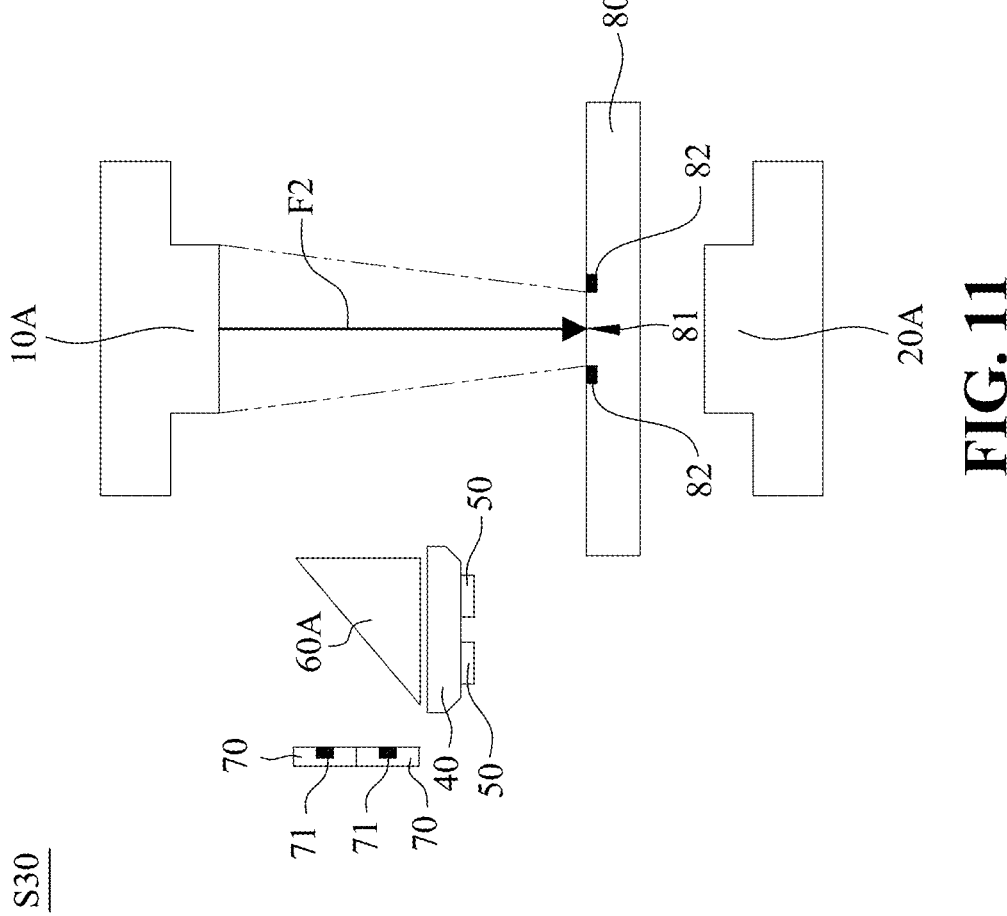
FIG. 11 is a schematic view of step S30 of the second embodiment of the method of the present invention.
Figure 12:
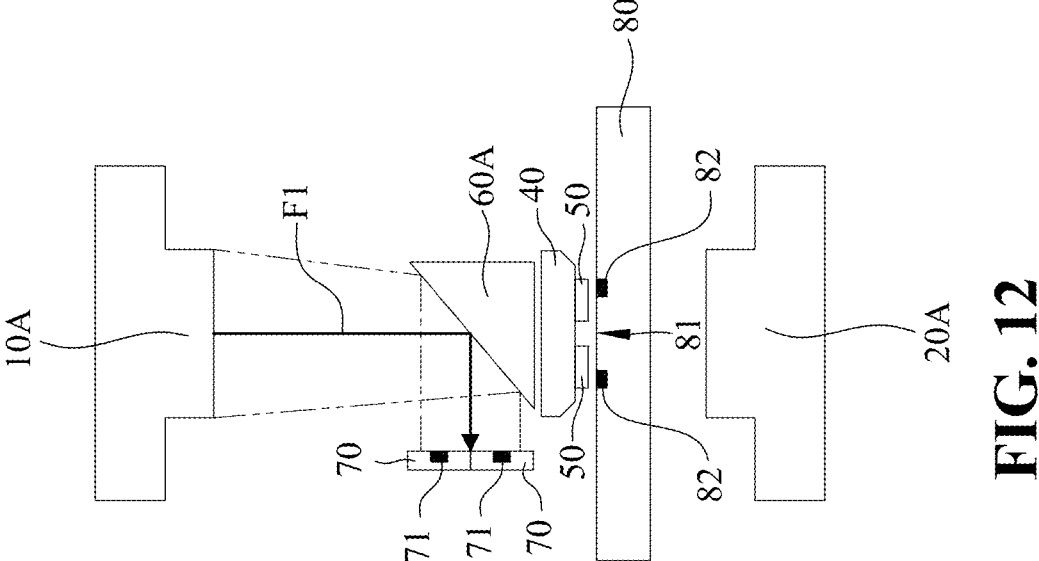
FIG. 12 is a schematic view of step S40 of the second embodiment of the method of the present invention.
Figure 13:
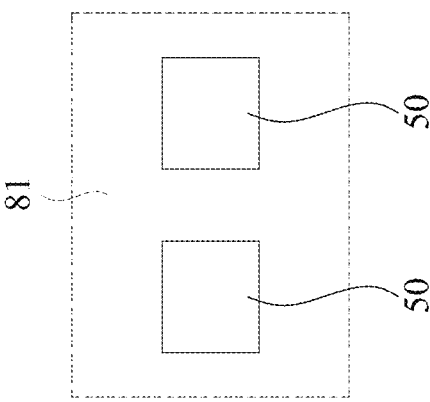
FIG. 13 is a schematic view of step S50 of the second embodiment of the method of the present invention.
Figure 13:
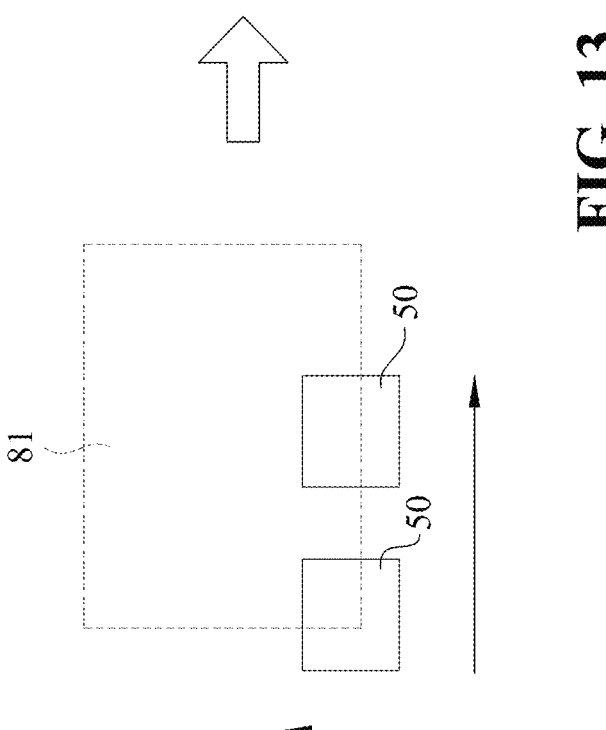
Figure 14:
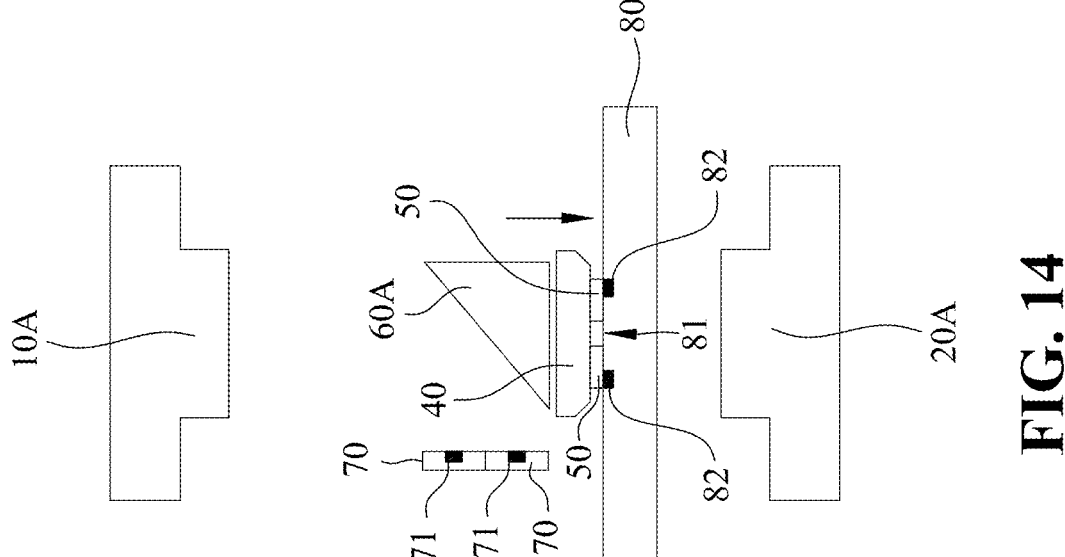
FIG. 14 is a schematic view of step S60 of the second embodiment of the method of the present invention.

FIG. 9 is a schematic view of step S10 of the second embodiment of the method of the present invention. FIG. 10 is a schematic view of step S20 of the second embodiment of the method of the present invention. FIG. 11 is a schematic view of step S30 of the second embodiment of the method of the present invention. FIG. 12 is a schematic view of step S40 of the second embodiment of the method of the present invention. FIG. 13 is a schematic view of step S50 of the second embodiment of the method of the present invention. FIG. 14 is a schematic view of step S60 of the second embodiment of the method of the present invention. As shown in FIGS. 9 to 14, the difference between the second embodiment and the first embodiment is that the number of the first image capture unit 10A is one, the number of the second image capture unit 20A is one, and the number of the reflecting reflector 60A is one with the reflective surface facing left. The correction sheets 70 are located on one side of the reflective surface of the reflector 60A and are arranged vertically. The die bonding device 40 suctions a plurality of die 50. In some embodiments, the correction sheets 70 may also be arranged horizontally or randomly, and each correction sheet 70 has a plurality of marks 71.

Figure 16:
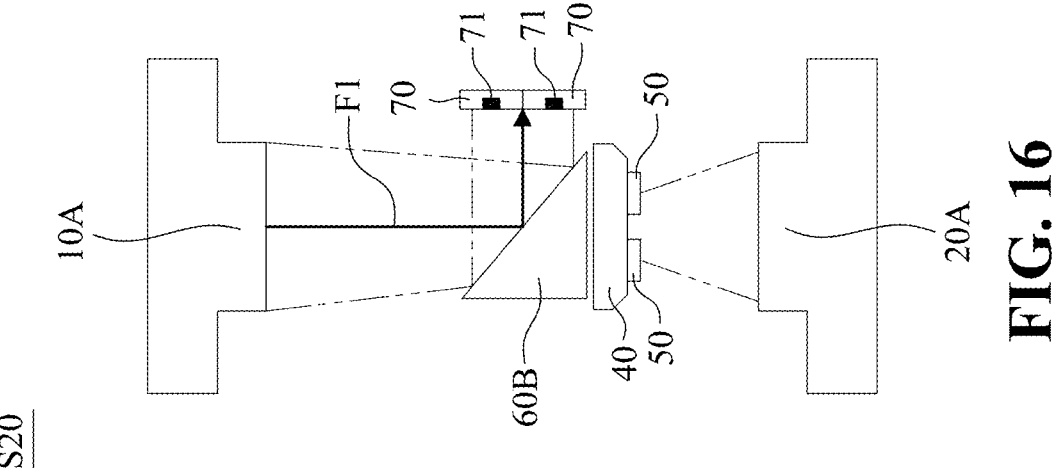
FIG. 16 is a schematic view of step S20 of the third embodiment of the method of the present invention.
Figure 15:
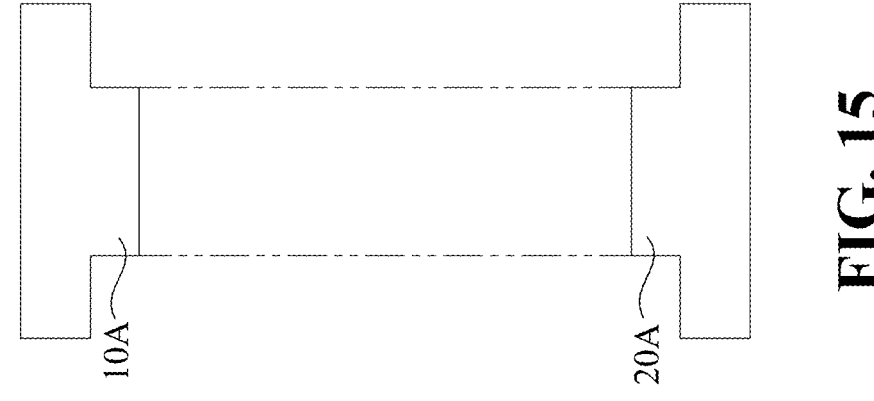
FIG. 15 is a schematic view of step S10 of the third embodiment of the method of the present invention.
Figure 17:
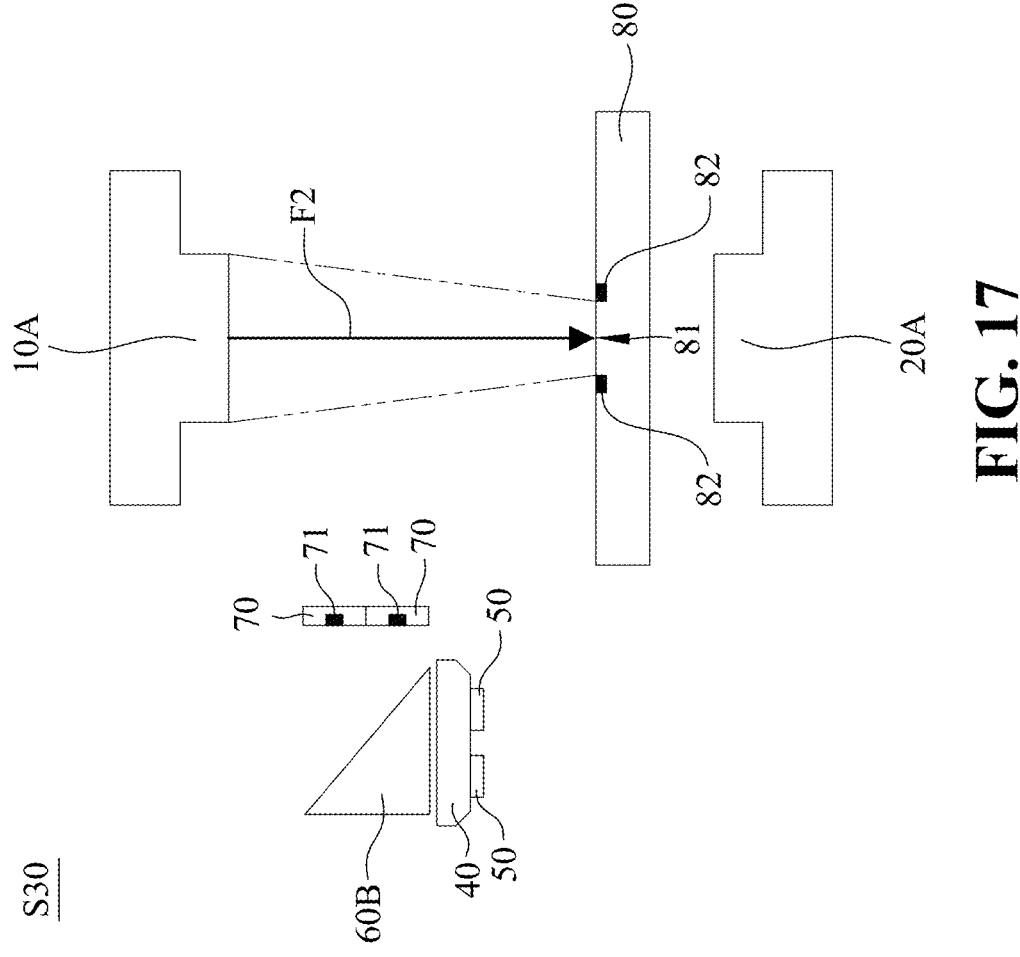
FIG. 17 is a schematic view of step S30 of the third embodiment of the method of the present invention.
Figure 18:
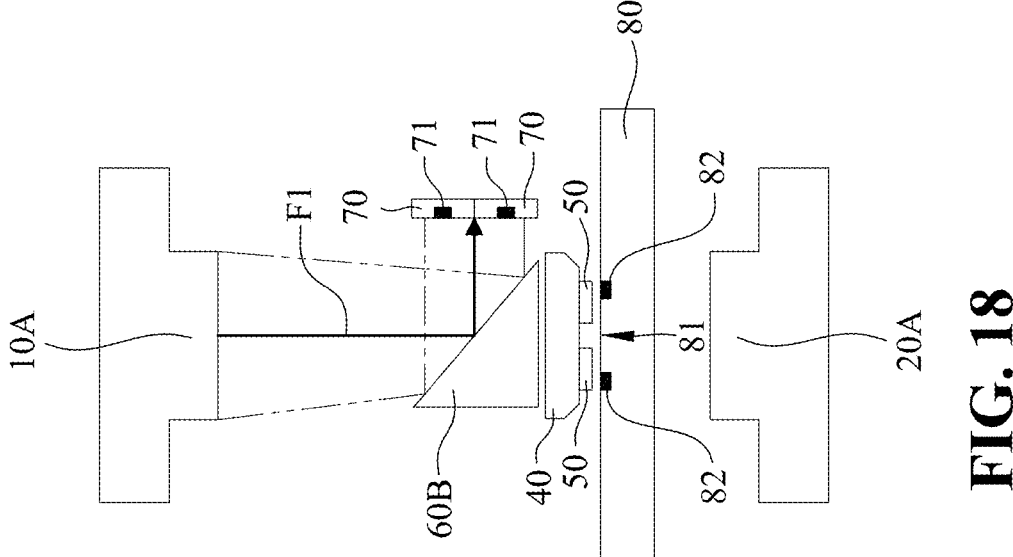
FIG. 18 is a schematic view of step S40 of the third embodiment of the method of the present invention.
Figure 19:
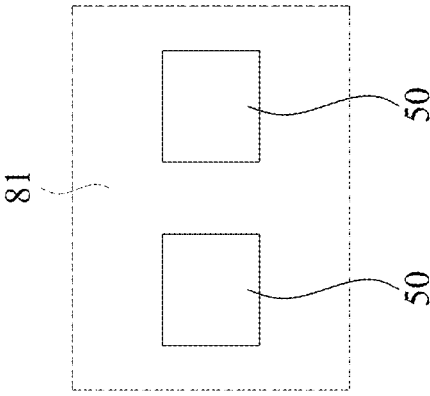
FIG. 19 is a schematic view of step S50 of the third embodiment of the method of the present invention.
Figure 19:
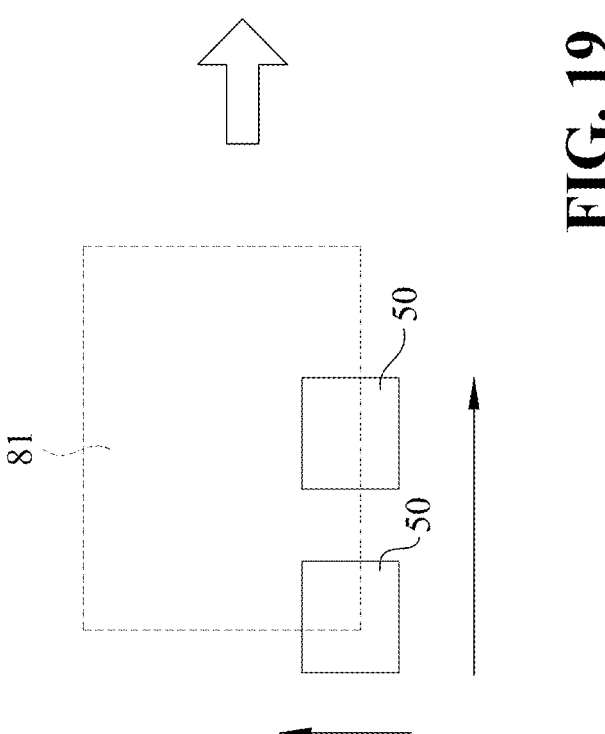
Figure 20:
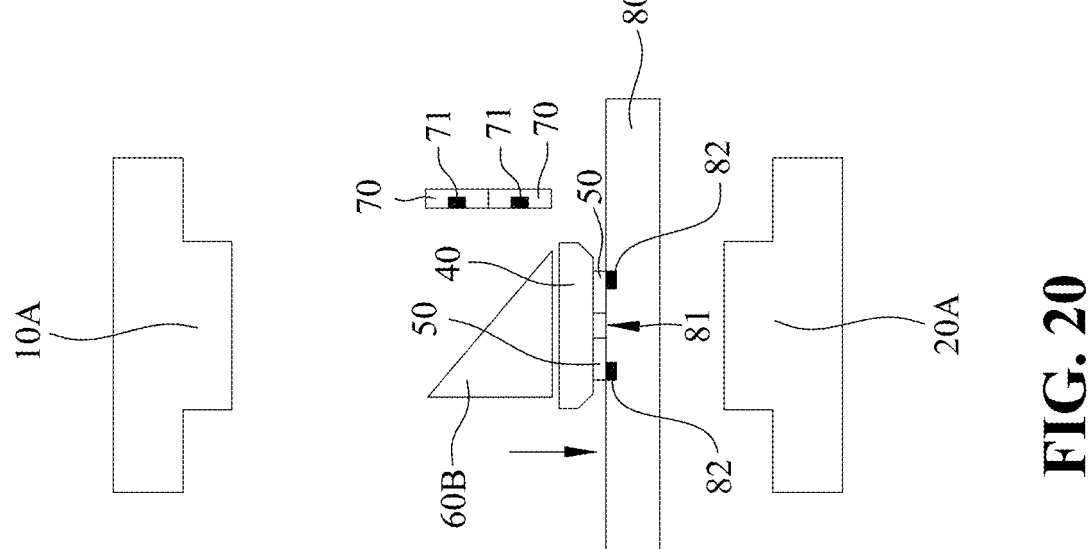
FIG. 20 is a schematic view of step S60 of the third embodiment of the method of the present invention.

FIG. 15 is a schematic view of step S10 of the third embodiment of the method of the present invention. FIG. 16 is a schematic view of step S20 of the third embodiment of the method of the present invention. FIG. 17 is a schematic view of step S30 of the third embodiment of the method of the present invention. FIG. 18 is a schematic view of step S40 of the third embodiment of the method of the present invention. FIG. 19 is a schematic view of step S50 of the third embodiment of the method of the present invention. FIG. 20 is a schematic view of step S60 of the third embodiment of the method of the present invention. As shown in FIGS. 15 to 20, the difference between the third embodiment and the second embodiment is that the reflective surface of the reflector 60B faces right, and the correction sheets 70 are located on one side of the reflective surface of the reflector 60B. In some embodiments, the correction sheets 70 may also be arranged horizontally or randomly, and each correction sheet 70 has a plurality of marks 71.

In summary, the method of the present invention can first obtain the first template through the first image capture units 10, or the first image capture unit 10A, the die bonding device 40, the reflector 60, 60A and the correction sheet 70, then the first image capture units 10 or the first image capture unit 10A obtain the position of the die placement area 81 of the substrate 80, and the first focal length F1 is equal to the second focal length F2. Therefore, the method of the present invention can, under the condition of keeping the first image capture units 10, or the first image capture unit 10A stationary, move the die-bonding device 40, the reflectors 60, 60A and the correction sheet 70 to the preset position synchronously.

Furthermore, the method of the present invention can, under the condition that the first image capture unit 10 when the die-bonding device 40, the reflectors 60, 60A and the correction sheet 70 are far away from the first image capture unit 10, 10A, directly and clearly capture the image of the mark 82 on the die placement area 81 of the substrate 80, so the position of the die placement area 81 of the substrate 80 obtained by the method of the present invention is accurate.

In addition, the method of the present invention can first obtain the second template through the second image capture unit 20, 20A, and then obtain the position of the die placement area 81 of the substrate 80 through the first image capture unit 10, 10A so that the method of the present invention can adjust the horizontal position of the die-bonding device 40 to ensure that the die 50 is aligned with the die placement area 81 of the substrate 80.

Moreover, the method of the present invention can first obtain the relative positions of the first image capture unit 10, 10A and the second image capture unit 20, 20A, and then use the relative positions of the first image capture unit 10, 10A and the second image capture unit 20, 20A to improve the accuracy of moving synchronously the die-bonding device 40, the reflectors 60, 60A and the correction sheet 70 to the preset positions and improves the accuracy of adjusting the horizontal position of the die-bonding device 40.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An encapsulation positioning mark method for encapsulating a die, comprising the steps of:

(a) using a control unit to synchronously move a die-bonding device, at least one reflector and at least one correction sheet to below at least one first image capture unit, until the at least one first image capture unit indirectly and clearly captures an image of at least one mark of the at least one correction sheet through reflection of the at least one reflector, to obtain a first template, at this point, the at least one mark of the at least one correction sheet is located at a first focal length of the at least one first image capture unit;

(b) using the control unit to synchronously move the die-bonding device, the at least one reflector and the at least one correction sheet away from the at least one first image capture unit and moving a substrate to below the at least one first image capture unit until the at least one first image capture unit directly and clearly captures an image of at least one mark on a die placement area of the substrate to obtain a position of the die placement area of the substrate, wherein at this time, the at least one mark on the die placement area of the substrate is located on a second focal length of the at least one first image capture unit, and the first focal length is equal to the second focal length; and (c) using the control unit to move the die-bonding device, the at least one reflector and the at least one correction sheet synchronously according to the first template and the position of the die placement area of the substrate to a preset position, so that the die-bonding device is aligned with the die placement area of the substrate;

wherein the image of the at least one mark of the at least one correction sheet in step (a) and the image of the at least one mark on the die placement area of the substrate in step (b) are taken by a same image capture unit of the at least one first image capture unit, and the at least one first image capture unit maintains stationary during the execution of the steps of the method.

2. The encapsulation positioning mark method according to claim 1, wherein step (a) further includes: using the die-bonding device to suction at least one die, and using the control unit to synchronously move the die-bonding device, the at least one reflector and the at least one correction sheet to above at least one second image capture unit until the at least one second image capture unit directly and clearly captures the image of the die-bonding device and the die to obtain a second template; wherein, after step (c), the method further includes the following steps: (d) using the control unit to adjust a horizontal position of the die-bonding device according to the second template and the position of the die placement area of the substrate until the die is aligned with the die placement area of the substrate; (e) using the die-bonding device to place the die on the die placement area of the substrate.

3. The encapsulation positioning mark method according to claim 2, wherein the following steps are further included before step (a): (f) using the at least one first image capture unit to capture an image of the at least one second image capture unit, using the at least one second image capture unit to capture an image of the at least one first image capture unit, and using the control unit to obtain relative positions of the at least one first image capture unit and the at least one second image capture unit according to the two images captured in step (f); wherein, step (c) further includes: using the control unit, according to the first template, the position of the die placement area of the substrate and the relative positions of the at least one first image capture unit and the at least one second image capture unit, to synchronously move the die-bonding device, the at least one reflector and the at least one correction sheet to the preset position; wherein step (d) further includes: using the control unit, according to the second template, the position of the die placement area of the substrate and the relative positions of the at least one first image capture unit and the at least one second image capture unit, to adjust the horizontal position of the die-bonding device.

4. The encapsulation positioning mark method according to claim 3, wherein the at least one first image capture unit comprises a plurality of first image capture units, the at least one second image capture unit comprises a plurality of second image capture units, the number of the at least one reflector comprises a plurality of reflectors with respective reflective surfaces in different directions, and the at least one correction sheet comprises a plurality of correction sheets respectively located on one side of the reflective surfaces of the reflectors.

5. The encapsulation positioning mark method according to claim 3, wherein the at least one first image capture unit comprises only one first image capture unit, the at least one second image capture unit comprises only one second image capture unit, the at least one reflector comprises only one reflector, and the at least one correction sheet comprises only one correction sheet, located on one side of the reflective surface of the reflector.

6. The encapsulation positioning mark method according to claim 2, wherein the at least one first image capture unit comprises a plurality of first image capture units, the at least one second image capture unit comprises a plurality of second image capture units, the at least one reflector comprises a plurality of reflectors with respective reflective surfaces in different directions, and the at least one correction sheet comprises a plurality of correction sheets respectively located on one side of the reflective surfaces of the reflectors.

7. The encapsulation positioning mark method according to claim 2, wherein the at least one first image capture unit comprises only one first image capture unit, the at least one second image capture unit comprises only one second image capture unit, the at least one reflector comprises only one reflector, and the at least one correction sheet comprises only one correction sheet, located on one side of the reflective surface of the reflector.

* * * * *